Aug. 10, 1965  F. R. SAVORY  3,199,395
GUILLOTINES

Filed July 11, 1963  5 Sheets-Sheet 1

Inventor
Frederick R. Savory
By
Watson, Cole, Grindle & Watson
Attorneys

Inventor
Frederick R. Savory
By
Watson, Cole, Grindle & Watson
Attorneys

United States Patent Office 3,199,395
Patented Aug. 10, 1965

3,199,395
GUILLOTINES
Frederick Ralph Savory, Sutton-in-Ashfield, England, assignor to Steel Construction & Engineering Co. (Notts) Limited
Filed July 11, 1963, Ser. No. 294,319
8 Claims. (Cl. 83—626)

This invention relates to guillotines of the type in which the vertically movable blade is actuated from a continuously rotatable drive.

One object of the invention is to provide simple means for transmitting the force from the rotary drive to the vertically movable blade, which means can be connected to the ends of or intermediately along a carrier for the movable blade.

Another object is to provide force-transmitting means which can be accommodated alongside the carrier for the movable blade and substantially within the same depth as that occupied by the carrier.

Another object is to provide a robust frame of fabricated construction formed mainly by welding together shaped metal plates.

Another object is to provide a frame which permits ready access to the moving parts of the guillotine and to any parts requiring adjustment or replacement.

Another object of the invention is to provide advantageous means for clamping plates to be sheared, while a further object is to provide means ensuring that no drive will be transmitted to the movable blade until the clamping means has been engaged and is applying a predetermined clamping pressure.

Yet another object of the invention is to provide simple means facilitating operation of the machine, especially in the location of a plate to be sheared, and with particular regard to personal safety of an operator.

Still further objects and numerous advantages of the invention will be apparent from the following description of one form of guillotine according to the invention, which it should be understood is by way of example only, reference being made to the drawings, in which FIGURE 1 is a front elevation of the machine;

Figure 1:
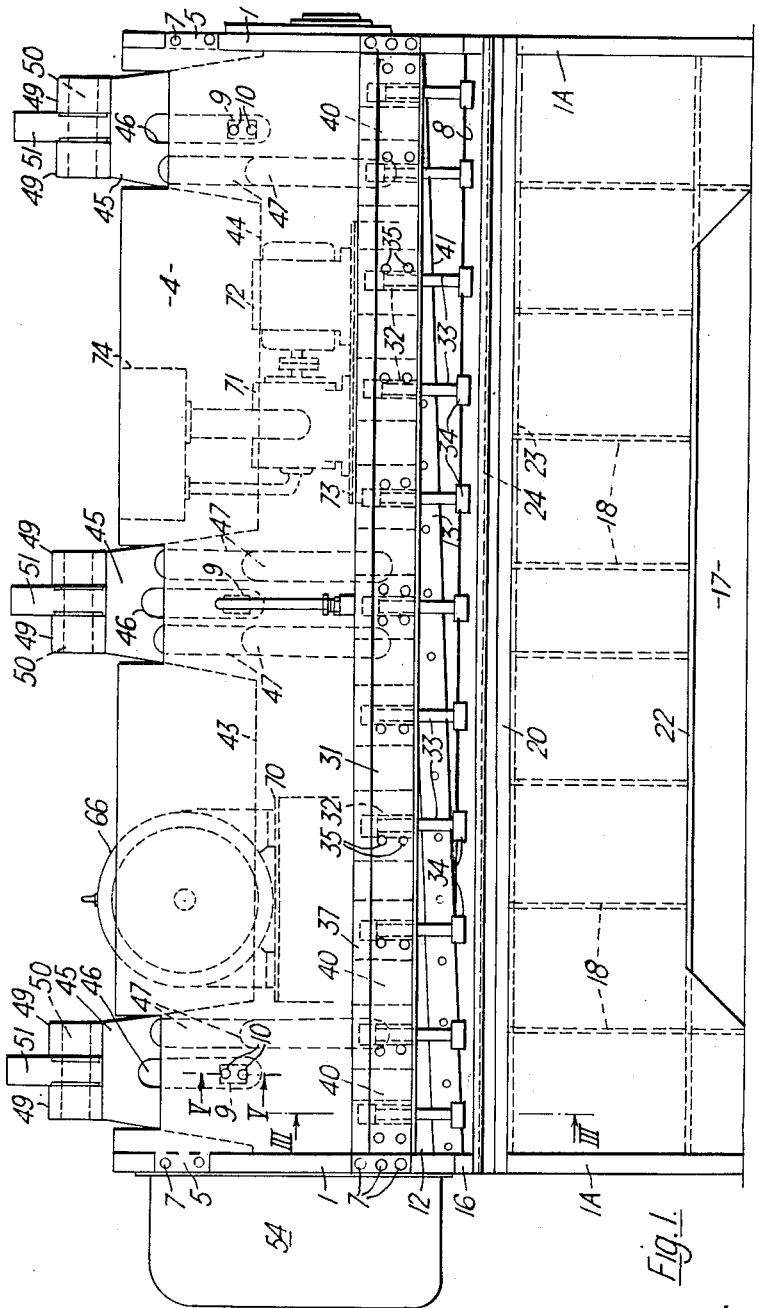
Figure 2:
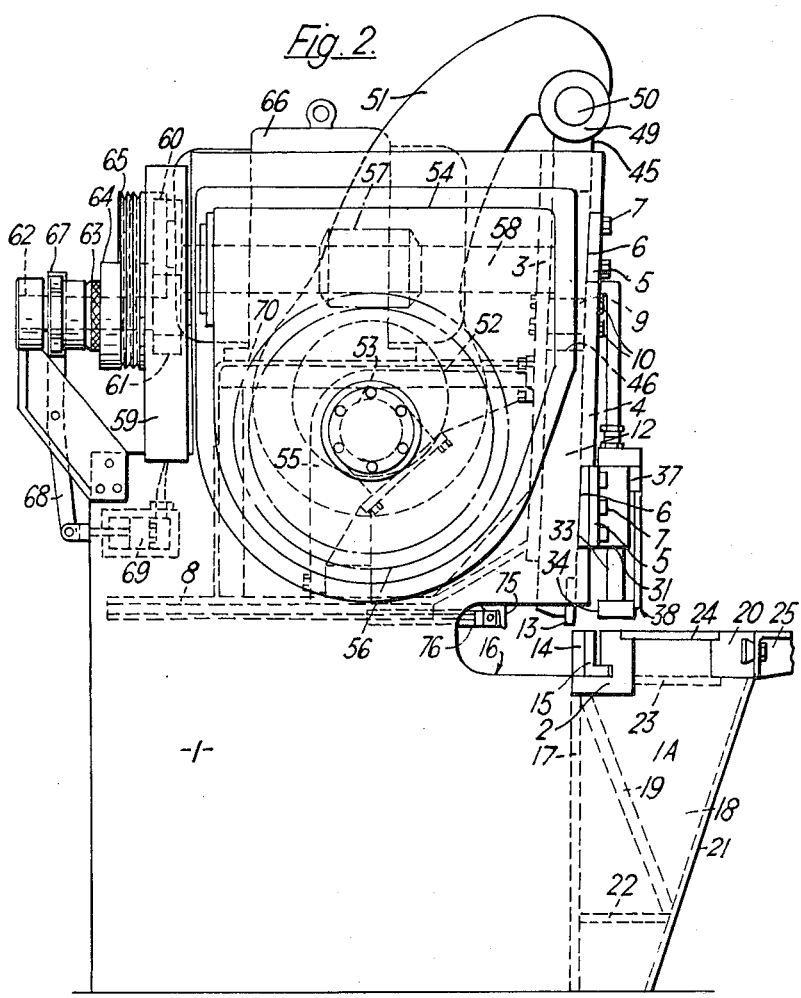
FIGURE 2 is a side view, to a slightly larger scale, taken from the left-hand side of FIGURE 1.
Figure 3:
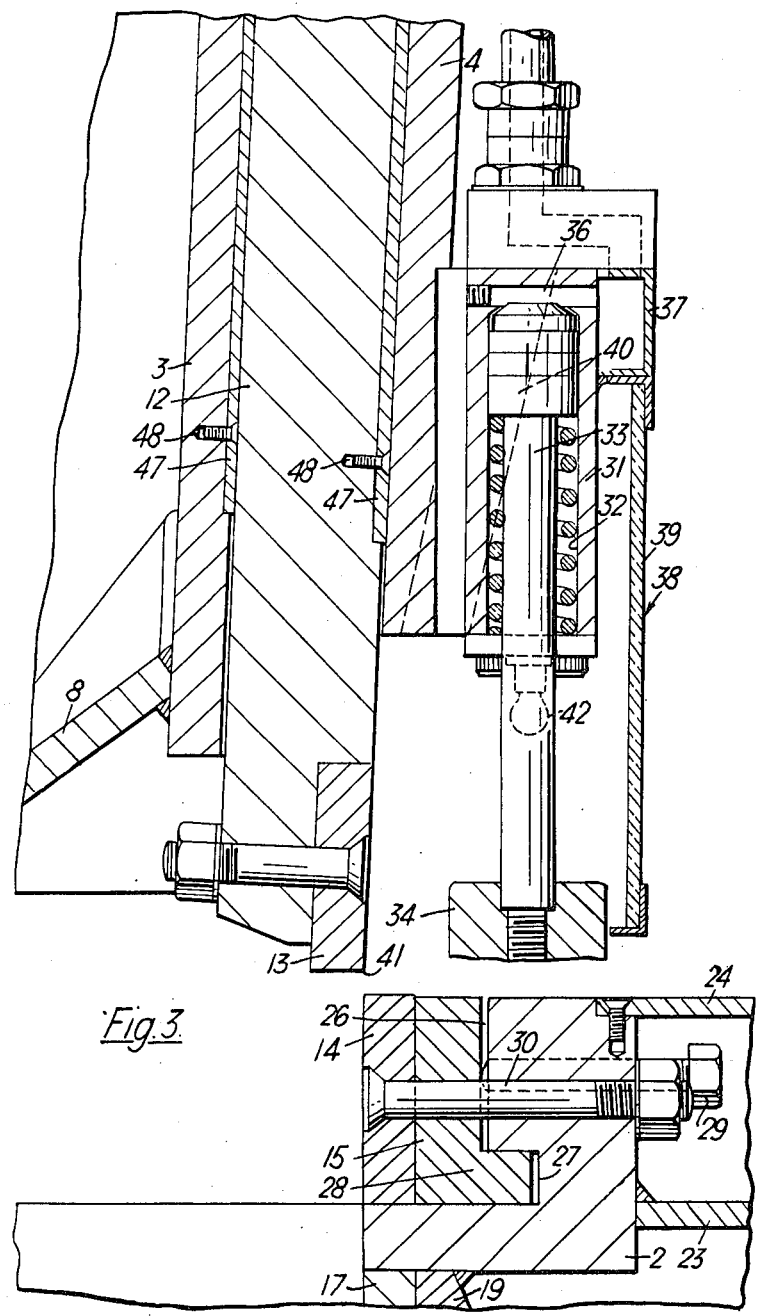
FIGURE 3 is a fragmentary vertical section, to a larger scale, taken from the line III—III in FIGURE 1.

FIGURES 1 and 2 show the machine frame formed as a prefabricated structure consisting of a pair of thick upstanding side-plates 1, a bolster-receiving member 2, welded between the front edges of the plates 1 to lie at a convenient working height, a back-plate 3 (see also FIGURE 4) welded between the plates 1 so as to provide a deep slot-like compartment between itself and a removable front-plate 4 having end tenons 5 that accurately fit sockets or notches 6 in the plates 1 and are there secured by bolts 7, a horizontal plate 8 welded between the side-plates and to the lower portion of the rear face of the back-plate, and bracing-pieces 9 (see also FIGURE 5) removably secured to and between the plates 3, 4 by bolts 10 and held in position on the back-plate 3 during assembly by a screw 11. The slot-like compartment houses a plate-like carrier 12 for a movable guillotine blade 13, which co-operates with a fixed blade 14 backed by a bolster 15, and the side-plates 1 are notched from the front at 16 for side access to the rear of the bolster-receiving member 2 (see also FIGURE 3).

Forward extensions 1A of the side-plates 1 make these plates generally L-shaped. These shorter arms 1A of the L's are connected by a series of vertical, horizontal, and inclined plates forming a reinforcing beam below the level of the bolster-receiving member 2. Below the removable front-plate 4, a vertical plate 17 is welded to the sideplates 1 and the bolster-receiving member 2, and stiffening webs 18 are welded to the plate 17 and the member 2. Inclined sections of plate 19 are welded between the webs 18 and into the angle between the plate 17 and the member 2, a member 20 with a dovetail slot is welded across the tops of the webs 18, and a plate 21 is welded to the rearwardly sloping front edges of the arms 1A and the webs 18. The box-section of the beam is completed by a lower horizontal plate 22 and an upper horizontal plate 23 welded in place across the bottom and top edges respectively of the webs 18, toe room being provided below the plate 22 for an operator standing in front of the box-section to handle work on the table formed by the members 2, 20 and a further horizontal plate 24 resting across the top of the arms 1A and secured by screws to the members 2, 20. The member 20 provides support for extension arms 25 (only one shown in FIGURE 2) for the support of wide plates to be worked.

The bolster-receiving member 2 has a rebate 26 with a parallel-sided groove 27 extending into the member 2 from the base of the rebate to receive the tongue 28 of the L-shaped bolster 15. Adjusting screws 29 through the member 2 bear on the bolster 15, and screws 30 alternating with the screws 29 (one only of each being shown in FIGURE 3) enable the bolster and blade to be adjusted accurately with respect to the movable blade 12. The tongue 28 is a close fit in the groove 27 to resist rotation of the bolster 15 about its own axis under the cutting thrust.

The front-plate 4 carries a bar 31 having eleven bores 32 forming cylinders for individual clamping rams 33, each ram carrying a clamp pad 34 and being upwardly spring-loaded. The bar is secured at its ends by the bolts 7 through the lower tenons 6 and intermediately by screws 35 to the front plate 4, so that the bar 31 contributes to the stiffness of the frame. Hydraulic fluid is fed to the bores 32 through passages 36 from a manifold 37, which is formed by welding a channel to the bar 31 and blocking up the ends of the channel. The channel 37 also serves to support a finger-guard 38 preferably having a transparent panel 39. Slots 40 in the bar 31 and the lower edge of the front-plate 4 permit downward sighting on to the shearing edge 41 of the movable blade 13, illumination of which is provided by a number of electric light bulbs 42 along the bar (only one bulb being shown in FIGURE 3) connected in parallel. The finger-guard has been omitted from FIGURE 1 for the sake of clarity.

The carrier 12 for the movable blade 13 is notched in two places 43, 44 so as to leave three integral tongue-like portions 45 for the application of the force required for the working stroke. The portions 45 are provided with vertical slots 46 to accommodate the bracing-pieces 9, and bearing strips 47 are secured by screws 48 in vertical recesses in the front face of the back plate 3 and the front face of the carrier 12, for co-operation with the back face of the carrier and the back face of the front-plate 4 respectively, in guiding the carrier for vertical movement. The upper ends of the portions 45 are provided with journal bearings 49 for connecting pins 50 for links 51, which extend upwardly and forwardly from eccentrics 52 on a shaft 53 rotatably mounted in bearings in one of the side-plates 1 and in a gearbox 54 secured to the other side-plate. Additional bearings are incorporated in further bracing-pieces 55 secured to and between the back-plate 3 and the horizontal plate 8.

Within the gearbox 54, the shaft 53 carries a pinion 56 meshing with a worm gear 57 on a transverse shaft 58, which extends beyond the rear side of the gearbox 54 into another gearbox 59 in which a pinion 60 on the shaft 58 meshes with a pinion 61 on a short shaft 62. The shaft 62 carries an axially-slidable clutch member 63, the other member of the clutch being a pulley 64 to which a drive is transmitted by a belt drive 65 from an electric motor 66. The clutch member 63 is spring-loaded out of engagement with the pulley 64, and is moved into driving engagement by a yoke 67 on one end of a simple lever 68 the other end of which is connected to hydraulic ram 69.

Figure 4:
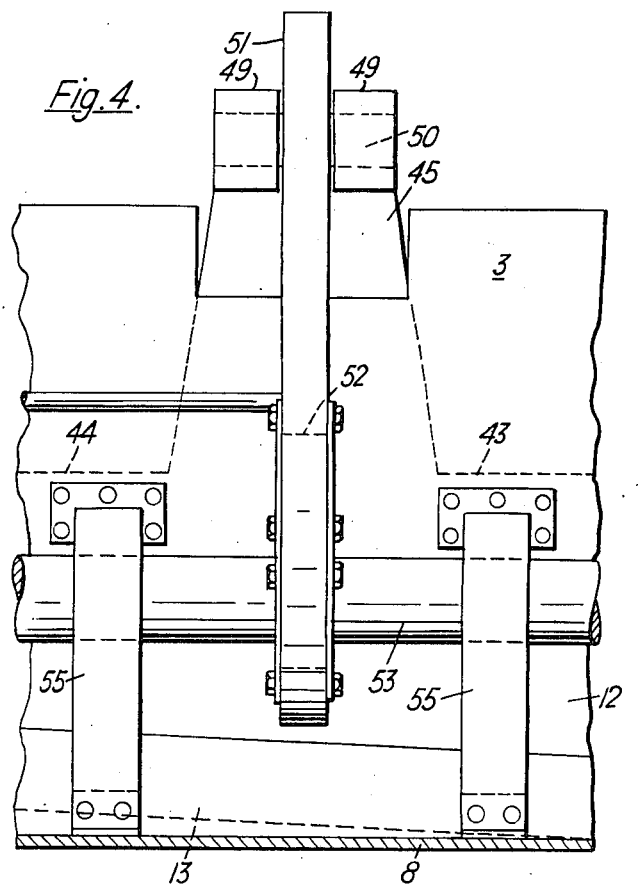
FIGURE 4 is a fragmentary rear view of the middle upper part of the machine.
Figure 5:
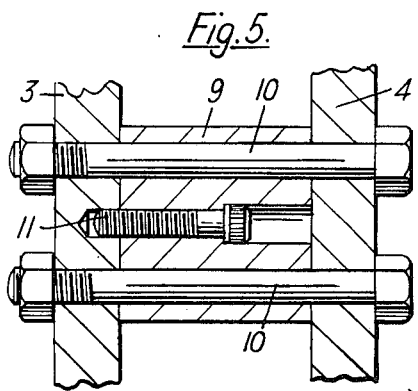
FIGURE 5 is a fragmentary vertical section, to a larger scale, taken on the line V—V in FIGURE 1.

The motor 66 is mounted on a bracket 70 in the space between the side-plates 1, behind the back-plate 3 and above the horizontal plate 8, and towards the side of the machine with the gearbox 54, and in the same space but towards the other side of the machine a pump 71 is mounted with its motor 72 on a bracket 73 beneath a supply tank 74 for the pump, the pump supplying both the clutch-operating ram 69 and the clamp rams 33 with fluid as will be described presently with reference to the hydraulic circuit of FIGURE 4.

A stop bar 75 carried by brackets 76 from guides 77 on the inside faces of the side-plates 1 is adjustable in accordance with the width of the plate to be sheared off, that severed width then falling behind the plate 17 to be removed from the back of the machine.

Figure 6:
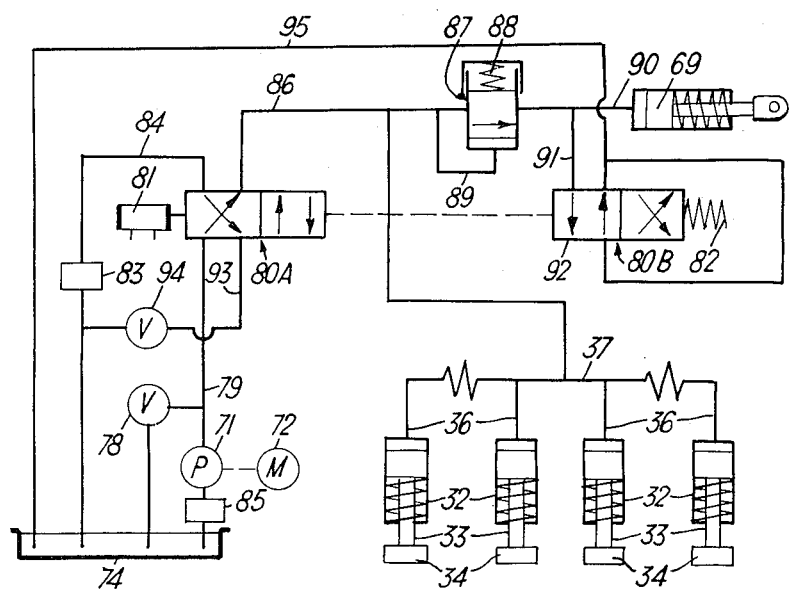
FIGURE 6 is a diagram of the hydraulic circuit.

In FIGURE 6, a relief valve 78 limits the pressure in the delivery line 79 of the pump 71, which delivery line leads to the first stage 80A of a control valve operated by a solenoid 81 and a spring 82. The solenoid is energised upon depression of a foot-operated switch (not shown) suitably positioned in front of the machine for operation by an operator feeding the machine. With the solenoid de-energised the spring 82 moves the valve to the left so that the output of the pump 71 is circulated through a filter 83 in a return line 84 back to the tank 74 from which the pump draws through a filter 85. When the solenoid is energised it moves the valve to the right so that the output of the pump passes into a supply line 86 with connections to the manifold 37 and a pilot-operated actuating valve 87 for the clutch-operating ram 69. The valve 87 is urged towards closed position by a spring 88, the loading of which is adjustable, thus the clamp rams 33 are operated first to bring the pads 34 into engagement with the plate to be sheared and/or the bolster-receiving member 2.

A pilot line 89 leads from the common supply line 86 to the opposite side of the valve 87 to the spring 88, so that when the pressure in the cylinders 32 (and, therefore, in the supply line 86) is slightly in excess of the load of the spring 88 the valve 87 is opened to communicate the line 86 with a line 90 leading to the clutch-operating ram which is therefore actuated to bring about engagement of the clutch members 63, 64 for a drive to be transmitted from the motor 66 to the blade carrier 12. A branch line 91 leads to a second stage 80B of the solenoid, spring-offset, control valve which, when the solenoid is energised presents a blocked port 92 to the line 91.

The lights 31 are preferably arranged to switch off automatically when the predetermined clamping pressure has been attained, as by providing a mechanical connection between the pilot-operated actuating valve 87 and a common switch (not shown) for the lights, the switch being closed when the valve is closed and open when the valve is open.

When the solenoid is de-energised, the spring 82 moves both stages of the control valve to the left, so that the line 86 is connected to a return line 93 including a non-return valve 94 and the clamp rams 33 are released, and the line 91 is connected to a return line 95 for the clutch-operating ram 69 to be released, the valve 87 having been closed by the spring 88 as the pressure in the pilot line 89 dropped along with the pressure in the line 86.

What I claim is:
1. A guillotine comprising a pair of upstanding side-plates, a bolster-receiving member welded between corresponding upstanding edges of the side-plates at a convenient working height, a back-plate welded between the side-plates at a distance from the edges to which the bolster-receiving member is welded and extending downwards from the top of the side-plates to above the level of the bolster-receiving member, a horizontal plate welded between the side-plates and to the lower portion of the rear face of the back-plate, a front-plate extending between the side-plates from the top of the side-plates downwards to the same level as the back-plate, means for removably securing the front-plate to the side plates, and at least one bracing-piece removably secured to and between the back-plate and the front-plate substantially above the lower edges thereof, together with a bolster for supporting an upwardly-facing fixed blade, a carrier for a downwardly-facing movable blade guided for vertical movement between the back-plate and the front-plate, a vertically-extending slot in the carrier for accommodating the bracing-piece, a shaft extending parallel to the carrier, bearings for the shaft secured to the frame, means for rotating the shaft, at least two eccentrics on the shaft, and links journalled at one end on the eccentrics and pivotally connected at the other end to the upper edge of the carrier.

2. A guillotine as in claim 1, wherein the side-plates are notched-out above and behind the bolster-receiving member.

3. A guillotine comprising a pair of upstanding side-plates, a bolster-receiving member welded between corresponding upstanding edges of the side-plates at a convenient working height, a back-plate welded between the side-plates at a distance from the edges to which the bolster-receiving member is welded and extending downwards from the top of the side-plates to above the level of the bolster-receiving member, a horizontal plate welded between the side-plates and to the lower portion of the rear face of the back-plate, a front-plate extending between the side-plates from the top of the side-plates downwards to the same level as the back-plate, means for removably securing the front-plate to the side plates, at least one bracing-piece removably secured to and between the back-plate and the front-plate substantially above the lower edges thereof, and at least one bracing-piece secured to and between the back-plate and the horizontal plate, together with a bolster for supporting an upwardly-facing fixed blade, a carrier for a downwardly-facing movable blade guided for vertical movement between the back-plate and the front-plate, a vertically-extending slot in the carrier for accommodating the bracing-piece between the back-plate and the front-plate, a shaft extending parallel to and alongside the carrier on the opposite side to the bolster for the fixed blade, end bearings for the shaft secured to the side-plates, at least one intermediate bearing for the shaft included in the bracing-piece between the back-plate and the horizontal plate, means for rotating the shaft, at least two eccentrics on the shaft, pivotal connections on the upper edge of the carrier, and links journalled on the eccentrics and extending upwardly and forwardly to the pivotal connections on the carrier.

4. A guillotine as in claim 1, wherein a fabricated beam is welded between the side-plates below the level of the bolster-receiving member.

5. A guillotine comprising a pair of upstanding side-plates, a bolster-receiving member welded between corresponding upstanding edges of the side-plates at a convenient working height, a back-plate welded between the side-plates at a distance from the edges to which the bolster-receiving member is welded and extending downwards from the top of the side-plates to above the level of the bolster-receiving member, a horizontal plate welded between the side-plates and to the lower portion of the rear face of the back-plate, a front-plate extending between the side-plates from the top of the side-plates downwards to the same level as the back-plate, notches in the front edges of the side-plates, tenons on the side edges of the front-plate fitting into the notches in the side-plates, bolts passing through the tenons and screwing into the side-plates, at least one bracing-piece between the back-plate and the front-plate substantially above the lower edges thereof, bolts passing right through the plates and the bracing-piece, together with a bolster for supporting an upwardly-facing fixed blade, a carrier for a downwardly-facing movable blade guided for vertical movement between the back-plate and the front-plate, a vertically-extending slot in the carrier for accommodating the bracing-piece, a shaft extending parallel to the carrier, bearings for the shaft secured to the frame, means for rotating the shaft, at least two eccentrics on the shaft, and links journalled at one end on the eccentrics and pivotally connected at the other end to the upper edge of the carrier.

6. A guillotine comprising a pair of upstanding side-plates, a bolster-receiving member welded between the side-plates at a convenient working height, a fabricated beam welded between the side plates below the level of the bolster-receiving member, a back-plate welded between the side-plates at a distance from the bolster-receiving member and extending downwards from the top of the side-plates to above the level of the bolster-receiving member, a horizontal plate welded between the side-plates and to the lower portion of the rear face of the back-plate, a front-plate extending between the side-plates from the top of the side-plates downwards to the same level as the back-plate, notches in the front edges of the side-plates, tenons on the side edges of the front-plate fitting into the notches in the side-plates, bolts passing through the tenons and screwing into the side-plates, bracing-pieces between the back-plate and the front-plate substantially above the lower edges thereof, bolts passing right through the plates and the bracing-pieces, further bracing-pieces secured to and between the back-plate and the horizontal plate, a bolster for supporting an upwardly-facing fixed blade, a carrier for a downwardly-facing movable blade guided for vertical movement between the back-plate and the front-plate, vertically-extending slots in the carrier for accommodating the bracing-pieces between the back-plate and the front-plate, a shaft extending parallel to and alongside the carrier on the opposite side to the bolster, end bearings for the shaft secured to the side-plates, intermediate bearings for the shaft included in the bracing-pieces between the back-plate and the horizontal plate, an electric motor, a clutch, a reduction gear-box having its output connected to the shaft and its input connected to the electric motor through the clutch, eccentrics on the shaft, pivotal connections on the upper edge of the carrier, links journalled on the eccentrics and extending upwardly and forwardly to the pivotal connections on the carrier, a bar secured across the front-plate, a multiplicity of vertical bores in the bar, clamping rams extending from the bores towards the lower bolster-supporting part of the frame, a common supply line for pressure fluid to all the rams, a ram for engaging the clutch, and a valve for connecting the supply line to the clutch-engaging ram, the valve being loaded towards closed position by an adjustable spring-loading and being opened by pressure fluid fed through a pilot line from the common supply line.

7. A guillotine comprising a pair of upstanding side-plates, a bolster-receiving member welded between corresponding upstanding edges of the side-plates at a convenient working height, a back-plate welded between the side-plates at a distance from the edges to which the bolster-receiving member is welded and extending downwards from the top of the side-plates to above the level of the bolster-receiving member, a horizontal plate welded between the side-plates and to the lower portion of the rear face of the back-plate, a front-plate extending between the side-plates from the top of the side-plates downwards to the same level as the back-plate, means for removably securing the front-plate to the side plates, and at least one bracing-piece removably secured to and between the back-plate and the front-plate substantially above the lower edges thereof, together with a bolster for supporting an upwardly-facing fixed blade, a carrier for a downwardly-facing movable blade guided for vertical movement between the back-plate and the front-plate, a vertically-extending slot in the carrier for accommodating the bracing-piece, a shaft extending parallel to the carrier, end bearings for the shaft secured to the frame, means for rotating the shaft, at least three eccentrics on the shaft, links journalled at one end on the eccentrics and pivotally connected at the other end to the upper edge of the carrier, and at least two intermediate bearings for the shaft provided one between each pair of eccentrics.

8. A guillotine comprising a pair of upstanding side-plates, a bolster-receiving member welded between corresponding upstanding edges of the side-plates at a convenient working height, a back-plate welded between the side-plates at a distance from the edges to which the bolster-receiving member is welded and extending downwards from the top of the side-plates to above the level of the bolster-receiving member, a horizontal plate welded between the side-plates and to the lower portion of the rear face of the back-plate, a front-plate extending between the side-plates from the top of the side-plates downwards to the same level as the back-plate, means for removably securing the front-plate to the side plates, and at least one bracing-piece removably secured to and between the back-plate and the front-plate substantially above the lower edges thereof, together with a bolster for supporting an upwardly-facing fixed blade, a carrier for a downwardly-facing movable blade guided for vertical movement between the back-plate and the front-plate, a vertically-extending slot in the carrier for accommodating the bracing-piece, a shaft extending parallel to and alongside the carrier on the opposite side to the bolster for the fixed blade, end bearings for the shaft secured to the frame, means for rotating the shaft, at least three eccentrics on the shaft, pivotal connections on the upper edges of the carrier, links journalled on the eccentrics and extending upwardly and forwardly to the pivotal connections on the carrier, and at least two intermediate bearings for the shaft provided one between each pair of eccentrics.

References Cited by the Examiner

UNITED STATES PATENTS

| 923,293 | 6/09 | Peters | 83—626X |
|---|---|---|---|
| 2,047,322 | 7/36 | Hazelton | 83—461 |
| 2,766,825 | 10/56 | Pater | 83—624X |

FOREIGN PATENTS

| 910,138 | 5/46 | France. |
|---|---|---|
| 831,354 | 3/60 | Great Britain. |
| 341,050 | 10/59 | Switzerland. |

WILLIAM W. DYER, JR., *Primary Examiner.*

ANDREW R. JUHASZ, *Examiner.*